United States Patent
Salomon et al.

(10) Patent No.: US 10,200,722 B2
(45) Date of Patent: Feb. 5, 2019

(54) METHOD AND APPARATUS FOR CLASSIFYING AND TRANSMITTING DATA FROM AN EVENT

(71) Applicant: SKYCAM, LLC, Fort Worth, TX (US)

(72) Inventors: Nic Salomon, Dallas, TX (US); Stephen Wharton, Weatherford, TX (US)

(73) Assignee: SKYCAM, LLC, Fort Worth, TX (US)

( * ) Notice: Subject to any disclaimer, the term of this patent is extended or adjusted under 35 U.S.C. 154(b) by 0 days.

(21) Appl. No.: 14/108,563

(22) Filed: Dec. 17, 2013

(65) Prior Publication Data

US 2014/0168442 A1 Jun. 19, 2014

Related U.S. Application Data

(60) Provisional application No. 61/738,107, filed on Dec. 17, 2012.

(51) Int. Cl.
| | |
|---|---|
| *H04N 21/218* | (2011.01) |
| *H04N 21/2187* | (2011.01) |
| *H04N 21/234* | (2011.01) |
| *H04N 21/462* | (2011.01) |
| *H04N 21/488* | (2011.01) |
| *H04N 21/845* | (2011.01) |
| *H04N 21/858* | (2011.01) |

(52) U.S. Cl.
CPC ... *H04N 21/21805* (2013.01); *H04N 21/2187* (2013.01); *H04N 21/23418* (2013.01); *H04N 21/4622* (2013.01); *H04N 21/4882* (2013.01); *H04N 21/8456* (2013.01); *H04N 21/858* (2013.01)

(58) Field of Classification Search
CPC .................................................. H04N 21/21805
USPC ........................................................... 348/157
See application file for complete search history.

(56) References Cited

U.S. PATENT DOCUMENTS

| | | | | |
|---|---|---|---|---|
| 7,822,344 | B1 * | 10/2010 | Jachetta | H04J 14/0283 398/154 |
| 2002/0089606 | A1 * | 7/2002 | Forler | H04N 5/44513 348/569 |
| 2004/0073437 | A1 * | 4/2004 | Halgas, Jr. | G06Q 30/02 715/723 |
| 2006/0294566 | A1 * | 12/2006 | Zlattner | H04N 21/84 725/112 |
| 2008/0143842 | A1 * | 6/2008 | Gillard | G03B 37/04 348/218.1 |
| 2010/0229204 | A1 * | 9/2010 | De Nijs | H04H 20/42 725/62 |
| 2013/0117130 | A1 * | 5/2013 | Dyor | G06Q 30/0273 705/14.71 |

* cited by examiner

*Primary Examiner* — Jeffery A Williams
(74) *Attorney, Agent, or Firm* — Schroeder Intellectual Property Law Group, LLC

(57) ABSTRACT

A device and method for collecting data from an event and retransmitting same with high value portions of the data identified. Low value portions of the data from the event are identified so, if desired, they may be removed and replaced by other data, such as stats from the event, stats from other events, and trivia relevant to the event. Indications alert end users that the data signal is returning to high value portions.

17 Claims, 3 Drawing Sheets

METHOD AND APPARATUS FOR CLASSIFYING AND TRANSMITTING DATA FROM AN EVENT

CROSS REFERENCE TO RELATED APPLICATIONS

This application claims priority to U.S. Provisional Application No. 61/738,107 filed on Dec. 17, 2012, the entirety of which is incorporated herein by reference.

FIELD OF THE INVENTION

The invention relates to a method of classifying and transmitting data from an event, such as a sporting event like a football game, and further relates to a system for classifying and transmitting data from the event.

BACKGROUND OF THE INVENTION

Systems and methods currently exist that allow end users to select from a variety of camera angles to watch a live event as well as the broadcast of previously recorded content of such an event.

However, current systems and methods fail to recognize the enhanced value of movable data collection devices relative to data gathering locations.

Furthermore, while these systems and methods might recognize that the data from the event includes portions that are not desired, for example, during a timeout or in between plays at a football game, the transmission of same to the end user may still be desirable. When there are less desirable portions, current methods either provide alternate data streams, a continuous data stream with no distinction between desired and undesired content, or they allow users to switch between data streams. However, none of these methods assign a value or provide an indication of value for the content captured to help determine whether or not the content is desirable or available.

Additionally, current methods often provide low value data to the end user that is not desired or otherwise identified as such. Or they provide alternate data to the end user that is also not the data most desired by the end user.

Furthermore, while current methods are acceptable for some viewing methods, current methods do not provide an indicator of the availability of desired content.

The present invention is directed to providing a system and method that can provide solutions to these, as well as other, problems and improve the viewing experience.

SUMMARY OF THE INVENTION

In one embodiment of the present invention, the present invention provides a system for classifying and transmitting data from an event.

Such a system may include a data collection device for collecting data from an event. The data collection device preferably moves above, along, and/or behind (i.e., around) the event in at least one direction along an axis of a three dimensional space, and most preferably is capable of moving along all three axes of the three dimensional space. The data collection device also preferably includes a transmission system for transmitting the data to a processing center.

The processing center classifies a relative value for portions of the data into high value portions and low value portions. The processing center may include a receiver for receiving the data from the data collection device and a transmission system for sending a data signal to one or more end users and replacement data.

The data signal includes at least one high value portion and may also include an indicator indicating which portion is being transmitted—preferably only having indicators when high value portions of the event are being transmitted. If a viewer/user navigates away from the data signal during a low value portion, a new indicator sent with a new high value portion would alert the user to allow same to return to the data signal. Alternatively, the user's device may automatically return to the data signal upon receipt of a new indicator associated with a new high value portion.

Additionally, replacement data can be transmitted (from the processing center or from some other device/location) while the data collection device is obtaining low value portions and the data signal includes only low value portions. Once a high value portion is being collected again, the data signal will again include the high value portions and an indicator, and upon receipt of the new indicator associated with the newly transmitted high value portions, the user's device may switch back away from the replacement data. Alternatively, a newly transmitted indicator provided with a new high value portion may merely indicate (for example, visual indicator, audio indicator, and/or a vibration indicator) that a new high value portion is being transmitted and has been received.

In another embodiment of the invention, the invention is directed towards a method of classifying and transmitting data from an event.

The method includes the step of moving a data collection device around an event and collecting data from the event with the data collection device. The method may also include transmitting the data from the data collection device to a processing system and classifying portions of the data as having either a high value or a low value. Finally, the method may include transmitting a data signal to one or more end users, the data signal including at least one high value portion of the data, and an indication that the data signal includes a high value portion.

The method may also include the step of returning a user to the data signal after receipt of the indication.

The method may include the step of storing replacement data and/or including replacement data in the data signal during, for example, when the data collection device is collecting a low value portion.

A system and method according to one or more embodiments is beneficial for a variety of reasons.

For example, such a system and method may allow an end user to select the data from the collection device and may not require the end user to switch data streams when low value content is being transmitted.

In addition, the system and method may indicate and/or automatically return to the data signal when high value content is being transmitted. This will aide in minimizing the chance that if a user that navigates away from the data signal the user will not miss the next high value portion of the data signal.

Further, the system and method may allow the end user to have increased access to high value content which may not presently be available using existing systems, devices, and methods.

These benefits, as well as others, will be readily apparent to those of ordinary skill in the art in view of the following detailed description and attached drawings.

It is to be understood that the aspects and objects of the present invention described above may be combinable and that other advantages and aspects of the present invention

BRIEF DESCRIPTION OF THE DRAWINGS

The present invention will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION OF THE DRAWINGS

Figure 1:
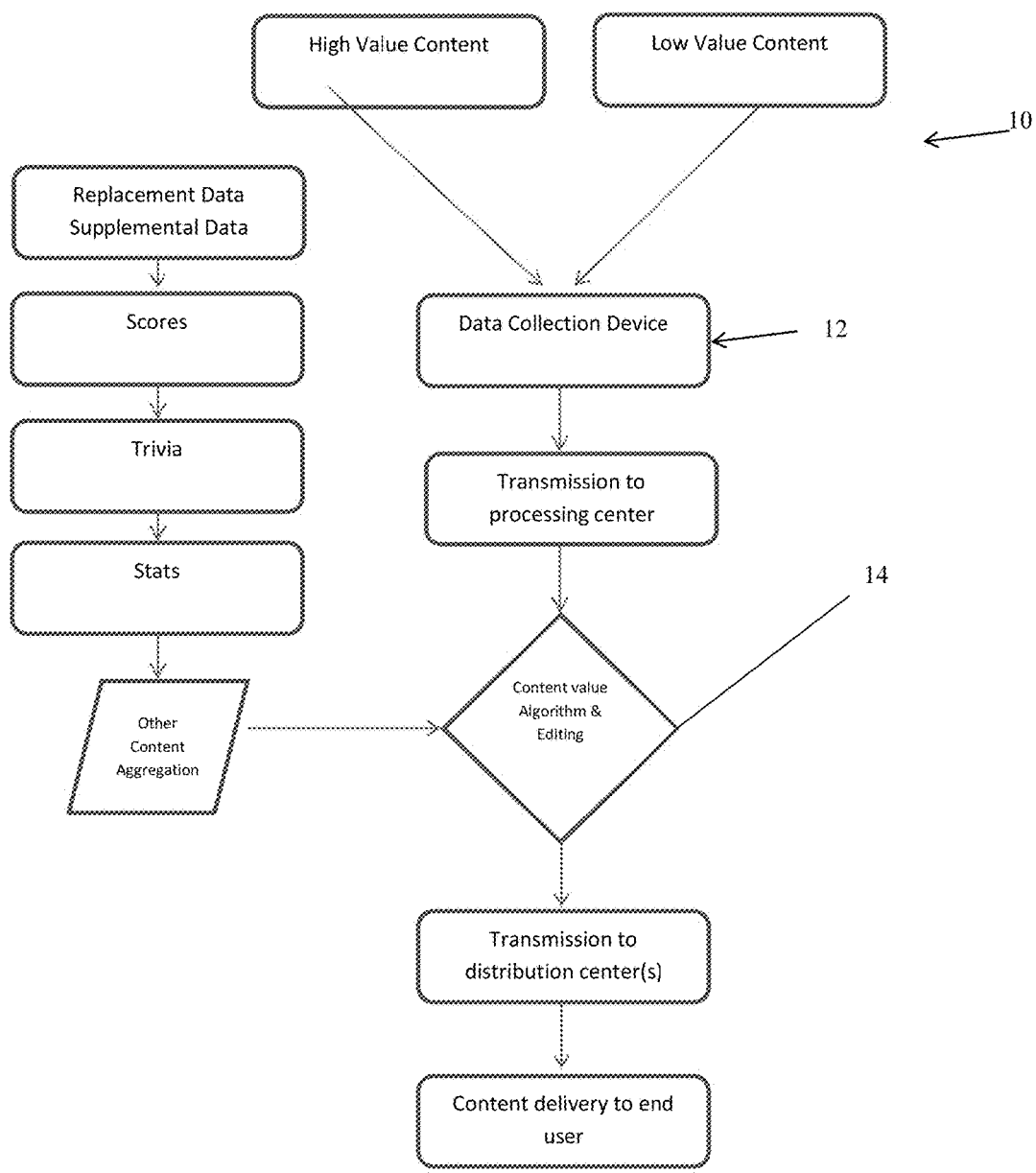
FIG. 1 is a diagram of an apparatus/method according to one or more embodiments of the present invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference throughout this description to features, advantages, objects or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, any discussion of the features and advantages, and similar language, throughout this specification may, but does not necessarily, refer to the same embodiment.

Figure 2:
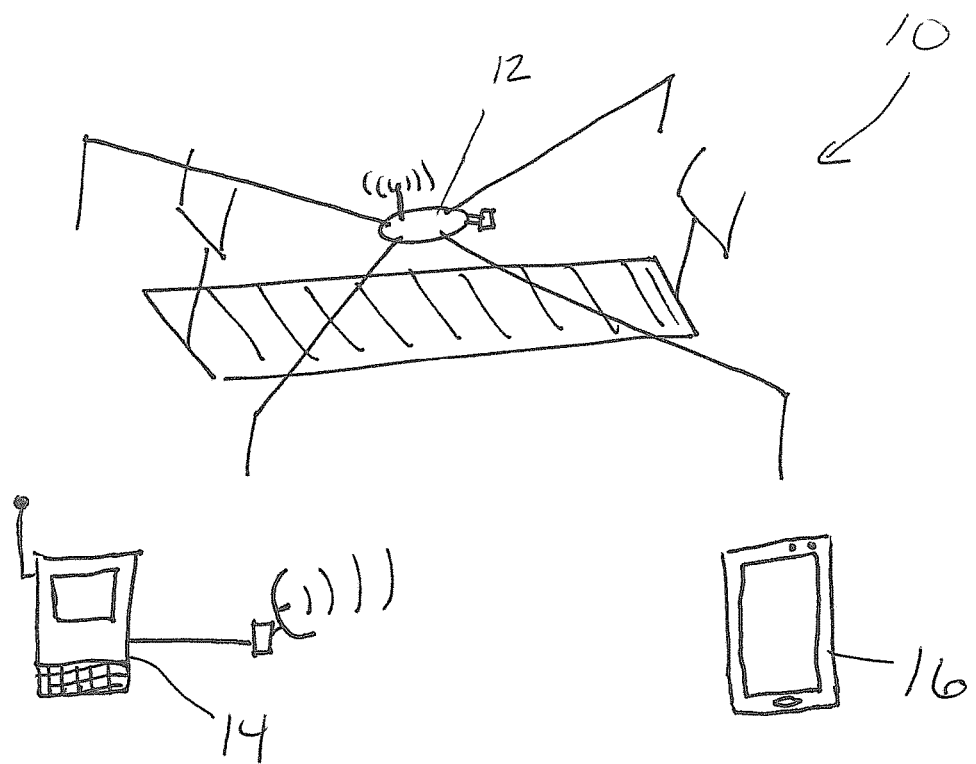
FIG. 2 is a perspective view of a system according to one or more embodiments of the present invention.

As shown in FIGS. 1 and 2, the invention relates to system 10 for taking one or more video, audio or other data (collectively "data") from an event with at least one moving data collection device 12, transmitting the data to processing center 14 wherein the data is identified and classified relative to the value of the data and transmitted, in a data signal, to one or more end users for viewing, listening, etc.

With the exception of keeping away from obstacles in the path of each moving data collection device 12, each moving data collection device 12 should be capable of moving through at least one axis of three-dimensional space (and preferably all three). There is no limit to the number of moving data collection devices 12 used with system 10. Furthermore, data collection devices 12 can be on a track, on a vehicle, supported by cables (see, FIG. 2), connected to another means of transport including a person, or even floating in the air attached to, for example, a small helicopter.

The signals from each data collection device 12 can be delivered, either wireless or with wires, to processing center 14. At processing center 14, the data from each moving data collection device 12 may be identified and classified as having either higher value or lower value. This classification may be done manually, for example by a person observing the start and stop of the action sequences of a live or taped event. Alternatively, this classification may be done automatically through a means of recognizing the start and stop of the action sequences (including but not limited to the time shown on an event clock, the sounding of a whistle, or the location of people or objects at the event).

The selection of content for the end user to view based on these classifications can be determined in many ways, including a process where transmissions of high value signals or data from moving data collection device 12 to end users are physically started and stopped, or a system where the transmissions are continuous but include corresponding value data to be interpreted by the end user or end user device 16.

After the data has been classified, it is sent, as a data signal, to at least one end user. The end user can utilize handheld or wearable wireless devices 16, tablets, phones, televisions, computers, or a variety of similar devices capable of receiving the data signal and displaying or otherwise allowing access to the data in the data signal. This invention applies to signal and data transmissions to all end user devices, not just portable handheld devices and is not necessarily limited to how signals or data are delivered to end user devices or how end users select specific content.

Unlike current products and methods, the present invention captures the enhanced value of movable data collection devices relative to all other data gathering locations at an event from the time an action sequence starts until the time it stops. In the period between the stop of an action sequence and the start of the next action sequence, a moving data collection device may no longer hold the same value for viewing, listening to and gathering data from the event. During such periods, it is contemplated to temporarily cease the transmission of data from the moving data collection device and, instead, transmitting content other than the "low value content" being collected and transmit same to the end user devices. Before the start of the next action sequence, the data originating from each moving platform would then be restored based upon receipt of an indicator in the data signal that a high value portion has started (or is about to begin).

It is contemplated that the data signal also includes replacement data. See, FIG. 1. The replacement data may be supplied and/or transmitted by a third party. In a most preferred embodiment, the replacement data is included in the data signal when low value portions are being collected and/or transmitted.

However, it is contemplated that the replacement data be transmitted while the data signal includes high value content. Accordingly, in such an embodiment, the replacement data can be used as supplemental data, and can be displayed simultaneously as the high value portion being displayed. An example of such an embodiment is a scrolling new feed of scores from various sporting events across the bottom of the viewing screen.

The replacement data/supplemental data which may be delivered to end users during periods of reduced value includes but is not limited to other content including at least one of the following: sports trivia, fan polls, game statistics, event clock information, scores, event and player stats, fantasy sports data, pictures, video, audio, access to social media, access to the internet (suggested, like a link or hypertext, or free form internet browsing) and sports wagering applications. Especially in embodiments where more than one type of replacement data is supplied, it is contemplated to allow a user to select the desired type of replacement data via a "menu."

At times, some required content may be displayed to end users such as advertisements or commercials. It is contemplated that each end user can select from a variety of alternative content options available. One alternative is to continue to access to data being collected from the data collection device even during reduced value periods.

Similarly, even during higher value periods, alternative content could be accessible at the direction of each end user. However, when a high value portion returns to the data signal, the device may either automatically return to the data signal or it may provide a video, audio, visual, or other notification to the user that high value content has returned (or will soon return) to the data signal.

Figure 3:
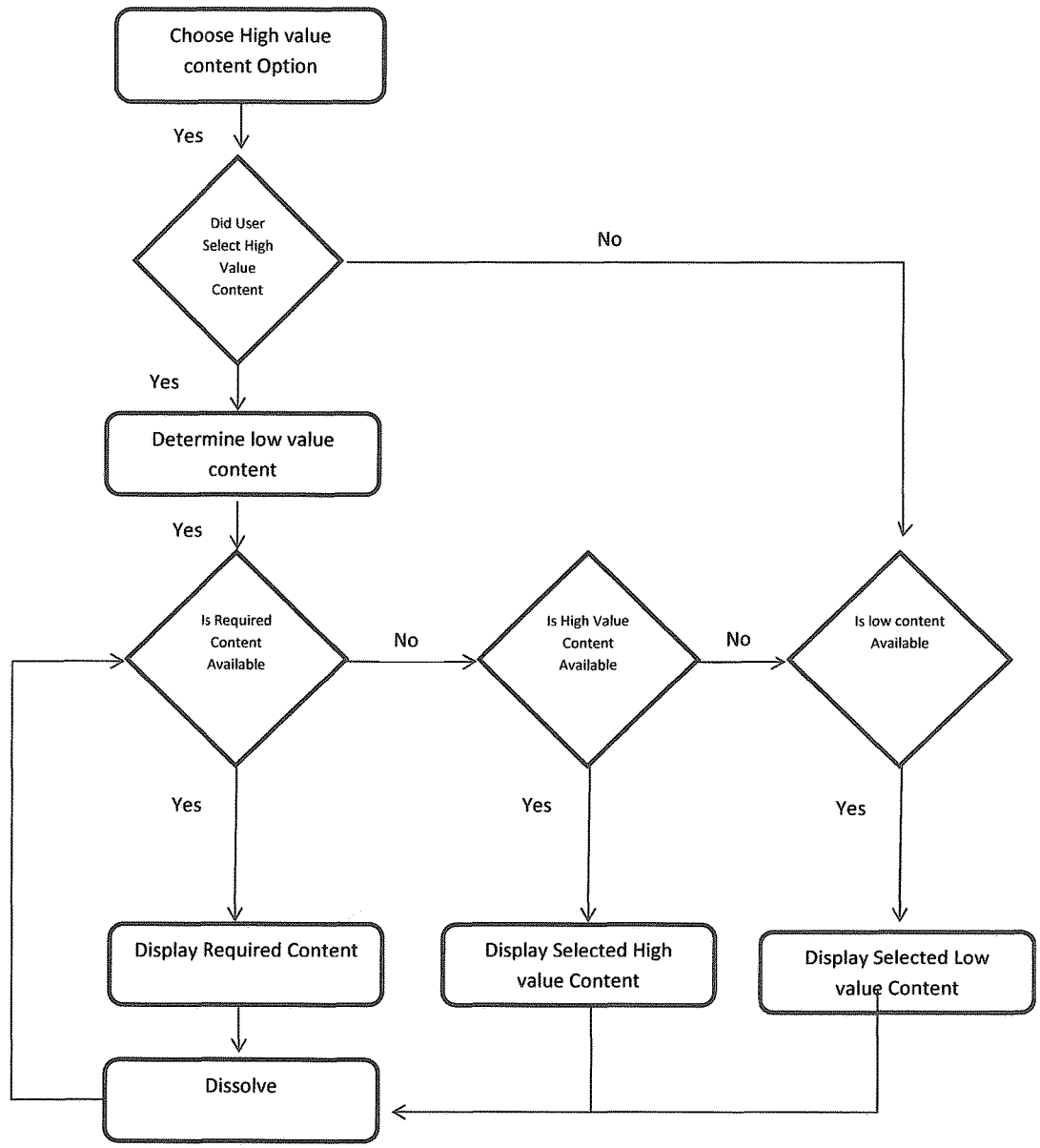
FIG. 3 is a logic diagram used in association with one or more embodiments of the present invention.

It is preferred that such a system 10, shown in FIG. 2, utilizes a method (see, FIGS. 1 and 3) contemplated by one or more embodiments of the present invention in which a data collection device 12 is moved about an event, data from the event is collected with the data collection device 12, the data from the data collection device is transmitted to a processing center 14 wherein portions of the data are classified as having either a high value or a low value, and, a data signal is transmitted to one or more end users via a device 16. The data signal includes at least one high value portion and an indicator for alerting the one or more end users that the data signal includes a high value portion.

It is further contemplated that that the data signal does not include any low value portions; however, in certain embodiments, it is contemplated that the data signal includes low value portions. For example, the data signal may only include high value portions (with associated indicators) and replacement data. Alternatively, if the data signal includes both high and low value portions, the user can opt to view the low value portion, or possibly, the replacement data.

With respect to the indicator, it is contemplated that the indicator is a visual indicator, an audio indicator, or a vibration indicator. For example, the indicator may create a pop up window on the device which the user is using to view the data signal. Another possible indicator would be an audio chime, a blinking light, or a vibrating device. There are a variety of indicators that could be utilized and be within the scope of the present invention.

In some embodiments of the present invention, the indicator will be simply a computer code signal that will automatically return the one or more end users to the data signal if the one or more end users have navigated away from the data signal. It is thought that such an indicator is preferable in a method wherein the data signal includes the low value portions as well as the high value portions.

The step of classifying the relative value of the data from each moving data collection device may be a manual process or it may automatic recognition that an action sequence at an event is ready to start based upon, for example, a whistle, an indicator from an official, or some other type of movement/ sound.

The sequence for identifying and classifying the relative value of signals or data from each moving data collection device may be follows: manual or automatic recognition that an action sequence at an event is ready to start; signals or data from one or more moving platforms are identified and classified as having higher value, allowing for either the transmission or receipt of the signals or data to be restored; manual or automatic recognition that an action sequence at an event has completed; and, signals or data from one or more moving data collection devices are identified and classified as having lower value, allowing for either the transmission or receipt of the signals or data to be dissolved. The sequence may then repeat itself for the duration of an event.

It is contemplated that the user downloads an application, or other software to allow the user to access and receive the data signal. Furthermore, it is also contemplated that the user merely log on to a hosted application that allows a user to interact with the data signal.

An example of the present invention will now be described in relation to a football game.

Prior to the start of the game, a user downloads an application on the user's cell phone or other wireless device like a tablet.

A camera is positioned above the football field and is moved about same during the game. The data (video, audio, or both) collected by the camera is sent to a processing center.

In the processing center, either an automatic computer program or a manual entry method determines if the collected data is occurring during a play, or in between plays. The data collected during the play is considered high value data, and the data collected in between plays is considered low value. The computer program or manual entry method may recognize the movement of the data collector, a whistle, an official's arms, or other indications to aide in determining the value of the collected data.

At the processing center a data signal is sent out. The data signal includes the high value portions of the collected data. Any user that has the application running will receive the data signal and can view/hear the collected audio/visual data. Preferably the application follows the logic of the method shown in FIG. 3.

The data signal also includes replacement data. After a play has been completed, the application displays replacement data, such as an advertisement, statistics about the event, or some other data. However, the user may return the display to the low value portions (if the data single includes the low value portions).

If the user has left the application, or is interacting with the replacement data, an indicator on the device will indicate that a high value portion is available (or will shortly be available). Alternatively, upon receipt of the indictor, the application will automatically display the high value portion of the data signal. This process will continue until the user completely closes the applicator and shuts off the receipt of the data signal, or until the event is fully completed and the data signal ends transmission.

Such a system and method may allow for a more individualized event experience—allowing the user to partly determine when and what is being viewed while at the same time not unintentionally missing out on desirable high value content.

Such a system and method may allow for an enhanced viewing experience which complements the traditional means of viewing of an event either in person or on a television.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for classifying and transmitting data from an event, the system comprising:
   a data collection device for collecting data from an event, the data collection device moving around the event in at least one direction and including a transmission system for transmitting the data;
   a receiver for receiving the data from the data collection device;
   a processing center for classifying a relative value of portions of the data into high value portions and low value portions; and,
   a transmission system for sending a data signal to one or more receiving devices controlled by one or more end users, wherein the data signal includes at least a high value portion from the data collected from the data collection device, one or more varieties of replacement data and/or alternative content, and an indicator, wherein the data signal includes the one or more varieties of replacement data and/or alternative content when the data collection device is obtaining low value portions and each of the one or more end users can independently select receipt of either the low value portion or a variety of replacement data and/or alternative content from the one or more varieties of replacement data and/or alternative content included in the data signal received by each respective end user's receiving device and each of the one or more end users can independently select a variety of replacement data and/or alternative content from the one or more varieties of replacement data and/or alternative content included in the data signal received by each respective end user's receiving device, and each of the one or more receiving devices produces an alert for alerting the one or more end users that a high value portion is about to begin, alerting the end users to the high value portion in real-time.

2. The system of claim 1 wherein the data signal does not include any low value portions.

3. The system of claim 1 wherein the replacement data includes supplemental data that is displayed simultaneously with a high value portion.

4. The system of claim 1 wherein the data signal does not include any low value portions.

5. The system of claim 1, wherein the indicator is selected from the group consisting of: an audio notification, a visual notification, a vibrating notification.

6. The system of claim 1, wherein the data signal only includes data from the data collection device.

7. The system of claim 1, wherein the data signal includes all of the low value portions collected and all of the high value portions collected.

8. The system of claim 7, wherein the data signal also includes replacement data.

9. The system of claim 8 wherein the data single includes replacement data only when the data signal includes a low value portion.

10. A method comprising the steps of:
    moving a data collection device around an event;
    collecting data from the event with the data collection device;
    transmitting the data from the data collection device to a processing center;
    classifying portions of the data as having either a high value or a low value;
    transmitting a data signal to one or more receiving devices controlled by one or more end users, the data signal at least partially comprising the data collected from the event and one or more of replacement data and/or alternative content wherein the data signal also includes the one or more varieties replacement data and/or alternative content only when the data signal includes a low value portion and each of the one or more end users can independently select receipt of either the low value portion or a variety of replacement data and/or alternative content from the one or more varieties of replacement data and/or alternative content included in the data signal received by each respective end user's receiving device;
    wherein each of the one or more end users can independently select a variety of replacement data and/or alternative content from the one or more varieties of replacement data and/or alternative content included in the data signal received by each respective end user's receiving device, and the data signal includes at least one high value portion and an indicator, each of the one or more receiving devices producing an alert in response to the indicator for alerting the one or more end users a high value portion of the data signal is about to begin, allowing the one or more end users to watch all high value portions in real-time, as the high value portion occurs.

11. The method of claim 10 wherein the replacement data is supplied and/or transmitted by a third party.

12. The method of claim 10, wherein each of the one or more end users can independently select a variety of replacement data and/or alternative content to be received by each respective end user's receiving device simultaneously with a high value portion.

13. The method of claim 10 wherein the data signal does not include any low value portions.

14. The method of claim 10 wherein the indicator is selected from the group consisting of: a visual indicator, an audio indicator, and a vibrating indicator.

15. The method of claim 10 wherein the indicator will automatically return the one or more end users to the data signal if the one or more end users have navigated away from the data signal when a high value portion begins.

16. The method of claim 10, wherein the data signal includes all of the low value portions collected and all of the high value portions collected.

17. The system of claim 1, wherein the indicator automatically returns the one or more end users to the data signal each time a high value portion begins.

* * * * *